United States Patent
Peng et al.

(10) Patent No.: US 8,279,386 B2
(45) Date of Patent: Oct. 2, 2012

(54) LIQUID CRYSTAL DISPLAY DEVICE HAVING PARTICULAR ORIENTING STRUCTURES

(75) Inventors: Cheng-Chung Peng, Hsinchu (TW); Yuren Shen, Tainan (TW); Shih-Hung Fa, Taipei County (TW); Jin-Jei Wu, Taipei (TW)

(73) Assignee: Chimei Innolux Corporation, Miao-Li County (TW)

( * ) Notice: Subject to any disclaimer, the term of this patent is extended or adjusted under 35 U.S.C. 154(b) by 605 days.

(21) Appl. No.: 12/542,872

(22) Filed: Aug. 18, 2009

(65) Prior Publication Data

US 2010/0265443 A1    Oct. 21, 2010

(30) Foreign Application Priority Data

Apr. 21, 2009  (TW) ............................... 98113247 A

(51) Int. Cl.
G02F 1/1337    (2006.01)
G02F 1/141    (2006.01)

(52) U.S. Cl. ........ 349/130; 349/134; 349/125; 349/128; 349/129

(58) Field of Classification Search .................. 349/130, 349/134, 125, 128, 129
See application file for complete search history.

(56) References Cited

U.S. PATENT DOCUMENTS

| 6,710,825 B2 * | 3/2004 | Kubo et al. ..................... 349/48 |
| 6,710,837 B1 * | 3/2004 | Song et al. ..................... 349/143 |
| 6,879,364 B1 * | 4/2005 | Sasaki et al. .................. 349/129 |
| 7,532,291 B2 * | 5/2009 | Kubo et al. .................... 349/129 |
| 2004/0075791 A1 * | 4/2004 | Liu ............................. 349/114 |
| 2005/0257809 A1 | 11/2005 | Fedegari et al. |

FOREIGN PATENT DOCUMENTS

| JP | 11-242225 | 9/1999 |
| JP | 2000-267102 | 9/2000 |
| JP | 2003-043525 | 2/2003 |

* cited by examiner

*Primary Examiner* — Mike Qi

(74) *Attorney, Agent, or Firm* — Muncy, Geissler, Olds & Lowe, PLLC

(57) ABSTRACT

This object aims to provide a liquid crystal display panel with good in viewing angle characteristic, and capable of carrying out a high brightness display. The liquid crystal display device includes a first substrate having at least one pixel unit and at least one first orienting structure, a second substrate disposed opposite to the first substrate, and a liquid crystal layer sealed between the first and second substrates and having negative dielectric anisotropy. The pixel unit includes a pixel electrode that is located in the display area, while the first orienting structure is located outside the display area. In addition, the liquid crystal layer contains an optical rotation material, and some of the liquid crystal molecules in the liquid crystal layer are inclined toward the internal part or the external part of the pixel unit by the first orienting structure.

21 Claims, 15 Drawing Sheets

LIQUID CRYSTAL DISPLAY DEVICE HAVING PARTICULAR ORIENTING STRUCTURES

CROSS REFERENCE TO RELATED APPLICATIONS

This Non-provisional application claims priority under 35 U.S.C. §119(a) on Patent Application No(s). 098113247 filed in Taiwan, Republic of China on Apr. 21, 2009, the entire contents of which are hereby incorporated by reference.

BACKGROUND OF THE INVENTION

1. Field of Invention

The present invention is related to a liquid crystal display (LCD) device and, more particularly to a liquid crystal display device used in a wide viewing angle.

2. Related Art

In the liquid crystal display (LCD) device, the light transmission rate is controlled due to the different polarization effects or refraction effects induced by different alignments of the liquid crystal molecules, such that the LCD device can generate the desired image.

In general, the conventional twisted nematic (TN) LCD device has the disadvantage of narrow viewing angles because of the structure and optical features of the liquid crystal molecules. To resolve this issue, some different types of LCD devices with wide viewing angle, e.g. a multi-domain vertical alignment (MVA) LCD device and a patterned vertical alignment (PVA) LCD device, have been developed.

To increase the viewing angle of the LCD device, a pixel is divided into multiple domains with the MVA technology; hence the liquid crystal molecules in different domains may topple down in different directions.

FIG. 1 shows a conventional MVA LCD device 1 that includes two substrates 11 and 12, and a liquid crystal layer 13 disposed between the substrates 11 and 12. The substrate 11 is a driving substrate, on which a pixel electrode 111, a row conductor (not shown), a column conductor (not shown), and a thin film transistor (TFT) (not shown) are formed. The substrate 12 is a counter substrate, on which a counter electrode 121 and a color filter (not shown) are formed.

The alignment films 112 and 122 that are individually accommodated in the substrates 11 and 12 are used to vertically align the liquid crystal molecules of the liquid crystal layer 13. The substrates 11 and 12 further include convex structures 113 and 123, respectively, which are located between the pixel electrode 111 and the counter electrode 121. When a potential difference is applied to the substrates 11 and 12, the liquid crystal layer 13 is placed in the electric field generated by the potential difference, so that the liquid crystal molecules of the liquid crystal layer 13, which is affected by the electric field and the convex structures 113 and 123, will topple down in different directions.

However, in the perspective of the light emitting surface or the light incident surface of the LCD device 1, the convex structures 113 and 123 may affect the aperture ratio for they are located within the pixel electrode of the pixel, and since the liquid crystal molecules between the convex structures 113 and 123 are not affected by the electric field and do not topple down, the singular point is generated in each pixel and this will cause flaws in the displayed image.

Therefore, a LCD device with wide viewing angle that contains no singular point is highly desired to solve the above issues.

SUMMARY OF THE INVENTION

An object of the present invention aims to provide a LCD device used in a wide view angle that contains no singular point.

To achieve the above-mentioned object, the present invention discloses a LCD device including a first substrate having at least one pixel unit and at least one first orienting structure, a second substrate disposed opposite to the first substrate, and a liquid crystal layer sealed between the first and second substrates and having negative dielectric anisotropy. The pixel unit has a pixel electrode located in the display area of the LCD device, while the first orienting structure is located outside the display area. The liquid crystal layer contains an optical rotation material, and the first orienting structure forces some of the liquid crystal molecules of the liquid crystal layer to incline toward the internal part or the external part of the pixel unit.

The first orienting structure is disposed on the first substrate or the second substrate. In one aspect, the predetermined inclined angle formed by the first orienting structure is between 5 and 80 degrees, such that some of the liquid crystal molecules in the liquid crystal layer, which are originally perpendicular to the first or second substrate, are inclined toward the internal part or the external part about 5 to 80 degrees.

In the cross-sectional view of the first and second substrates, if the first orienting structure is disposed on the first substrate and the electric field is not applied to the liquid crystal layer, some of the liquid crystal molecules in the liquid crystal layer are affected by the first orienting structure and incline on rather than being perpendicular to the first substrate, and some are roughly perpendicular to the first substrate.

In addition, as an electric field is applied to the liquid crystal layer, the liquid crystal molecules in a sublayer of the liquid crystal layer are aligned in a concentric circular pattern, a spiral pattern, or an annular pattern. For instance, the orientations of the liquid crystal molecules in the liquid crystal layer are varied gradually between the first and second substrates either from the first substrate to the second substrate or another way around. In the display area, the liquid crystal molecules in a sublayer, which is parallel to the first substrate or the second substrate, topple down in different orientations rather than one. The toppling style of these liquid crystal molecules improves the dependency of the azimuth angle, so that a better wide viewing angle effect can be achieved compared to the conventional vertical alignment LCD device.

In addition, when an electric field is applied to the liquid crystal layer, the liquid crystal molecules in the liquid crystal layer are gradually twisted from the first substrate to the second substrate. For example, in the cross-sectional view of the first and second substrates, the twisting or toppling of the liquid crystal molecule varies with the intensity of the electric field.

For example, as a lower electric field is applied to the liquid crystal layer, the orientations of the liquid crystal molecules in the liquid crystal layer arranged from the first substrate to the second substrate are gradually from vertical to horizontal with rotation, and then gradually from horizontal to vertical with rotation. As the electric field applied to the liquid crystal layer becomes more intense, the orientations of the liquid crystal molecules in the liquid crystal layer arranged from the first substrate to the second substrate are gradually from vertical to horizontal with rotation, then gradually rotating in horizontal, and then gradually from horizontal to vertical with rotation.

The liquid crystal molecules are rotated at least 90 degrees from the first substrate to the second substrate, thus the LCD device has the advantage of a twisted nematic (TN) LCD device, which enhances the light transmission rate according to the optical rotation characteristics of the liquid crystal molecules.

Moreover, the liquid crystal molecules in a sublayer of the liquid crystal layer are toppled down to flat and rotated on a plane parallel to the first substrate. The rotation varies with the intensity of the electric field.

The liquid crystal molecules in the liquid crystal layer are made of a nematic liquid crystal material, for example, a nematic liquid crystal material with negative dielectric anisotropy. The liquid crystal molecules can be rotated along an axis and possess the optical rotation characteristics if the optical rotation material, e.g. a chiral material, is added to the liquid crystal layer. In order to provide sufficient space for the rotation of the liquid crystal molecules, the ratio of the thickness of the liquid crystal layer to the chiral pitch ranges from 0.16 to 0.42.

The first orienting structure may be a convex object or a concave object. When it is disposed on the first substrate, the first orienting structure may be formed by the row conductor or the column conductor of the first substrate, the gap of the pixel electrode, or an additional element. In contrary, when it is disposed on the second substrate, the first orienting structure may be formed by a black matrix, an additional element, or the gap of a counter electrode on the second substrate.

The LCD device may include a second orienting structure that is disposed on a substrate different from the first orienting structure. For example, the first orienting structure is disposed on the first substrate and the second orienting structure is disposed on the second substrate to form a predetermined inclined angle between 5 and 80 degrees. When the electric field is not applied to the liquid crystal layer, some of the liquid crystal molecules in the liquid crystal layer are roughly perpendicular to the second substrate, and some of the liquid crystal molecules incline with the affection of the first and second orienting structures.

The second orienting structure is a convex object or a concave object, which may be formed by the gap of a black matrix, an additional element, or a counter electrode of the second substrate.

The second orienting structure is located on the outside of the display area and disposed correspondingly to the first orienting structure. Alternatively, the first orienting structure and the second orienting structure may be disposed alternately.

In the embodiment, the first substrate or the second substrate further includes an alignment device, which vertically aligns some liquid crystal molecules and may be disposed on the same or different substrates with the first orienting structure. If the alignment device and the first orienting structure are disposed on the same substrate, the alignment device may cover the first orienting structure, such that some other liquid crystal molecules incline toward the internal part of the pixel unit; otherwise, the alignment device may not cover the first orienting structure, such that some other liquid crystal molecules incline in accordance with the first orienting structure only.

Both of the first substrate and the second substrate may further include the alignment devices, which are capable of vertically aligning some other liquid crystal molecules.

One or more first orienting structures are disposed around the pixel electrode. For example, the pattern of the first orienting structure may be a wall encircling the pixel electrode, or a plurality of the first orienting structures may be disposed around the pixel electrode, e.g. the first orienting structures are disposed adjacent to at least two corners of the pixel electrode, at least two sides thereof, or at least one corner and at least one side thereof.

In addition, the pixel unit includes two sub-pixel areas, and the first orienting structures are disposed adjacent to at least two corners or at least two sides of the sub-pixel areas.

In one aspect, the first substrate includes a plurality of the pixel units, each of which corresponds to one color, configured by the crossing row and column conductors, and each pixel is formed by a certain number of the pixel units. These pixel units are, for example, corresponding to colors red, green, and blue, respectively. A pixel unit may further include a plurality of sub-pixel areas.

In the liquid crystal layer, the area of a concentric circular pattern or a spiral pattern may be limited to a pixel unit, a pixel, a sub-pixel area of a pixel unit, a plurality of sub-pixel areas, or a plurality of pixels.

Based on the above description, the objective of the LCD device of the present invention having no singular point is to enhance the light transmission rate by the optical rotation characteristics of the liquid crystal molecules and increase the contrast by the vertical alignment liquid crystal molecules, such that the LCD device of the present invention not only combines the advantages of both the conventional TN LCD device and the MVA LCD device but also prevents the light leakage problem occurred in the conventional TN LCD device.

To conclude, the LCD device of the present invention discloses that the first orienting structure is located on the outside of the display area and leads the liquid crystal molecules in the liquid crystal layer to incline toward the internal part of the pixel electrode. Compared to the conventional MVA LCD device, the LCD device of the present invention not only resolves the visual defect caused by the singular point but also achieves the wide viewing angle effect.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

The following embodiments are presented based on a transmissive LCD device as well as a transflective LCD device.

Figure 1:
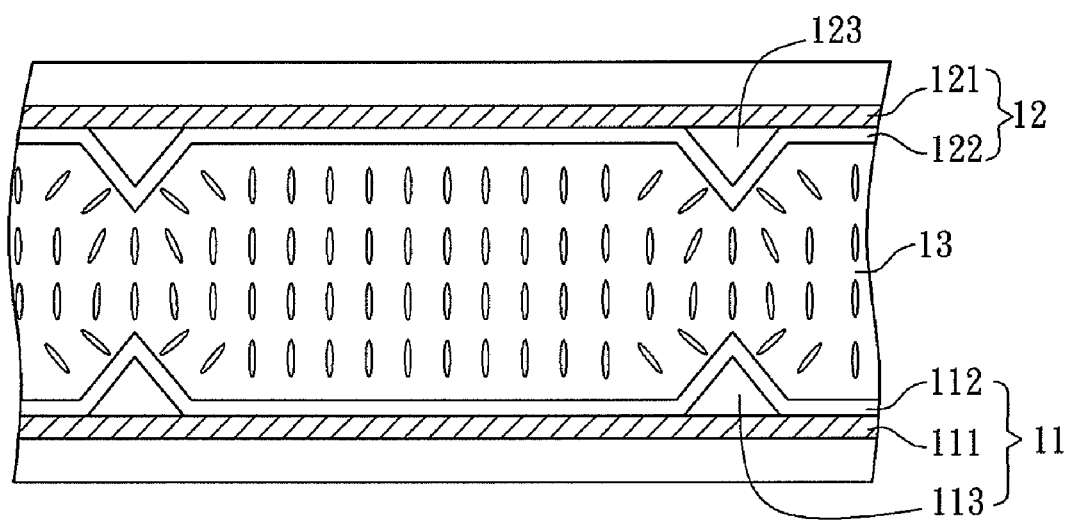
FIG. 1 is a schematic view of a conventional MVA LCD device.
Figure 2A:
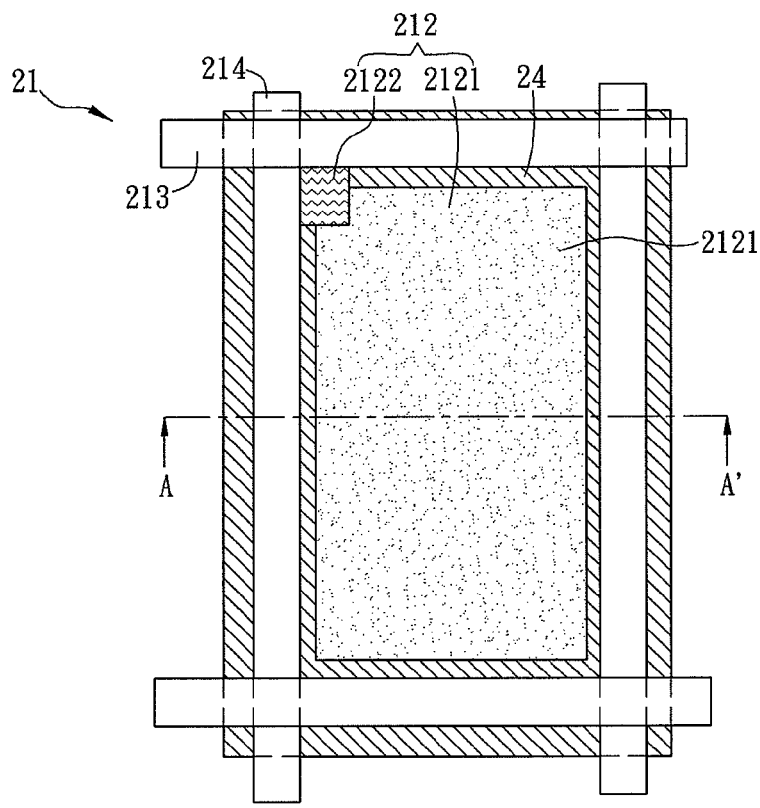
FIG. 2A is a top view of a LCD device according to an embodiment of the present invention.
Figure 2B:
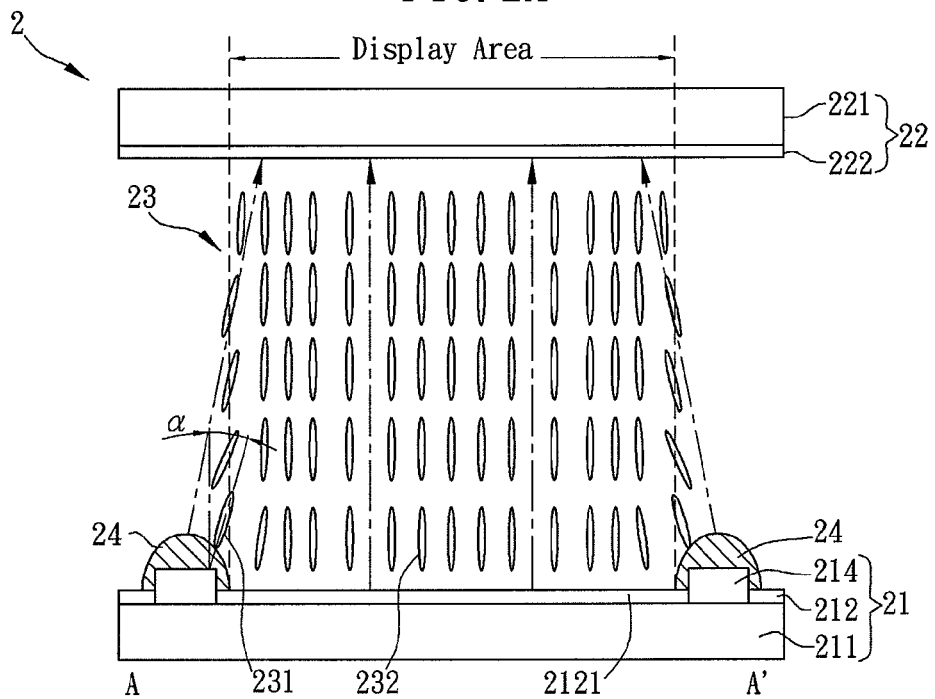
FIG. 2B is a side view of the LCD device in FIG. 2A.

FIG. 2A is a top view of a LCD device 2 and FIG. 2B is a side view of the LCD device 2. As shown in FIGS. 2A and 2B, the LCD device 2, which has wide view angle and no singular point, includes a first substrate 21, a second substrate 22 disposed opposite and roughly parallel to the first substrate, a liquid crystal layer 23 disposed between the first substrate 21 and the second substrate 22, and a plurality of first orienting structures 24. An optical rotation material, such as a chiral material, is added to the liquid crystal layer 22. The liquid crystal molecules in the liquid crystal layer are rotated along an axis that is parallel to a normal line of the first substrate 21 and possess the optical rotation characteristics.

The first substrate 21 may be a driving substrate including a base 211, a plurality of pixel units 212, a plurality of row conductors 213, and a plurality of column conductors 214, and a first orienting structure 24 and a pixel unit 212 are used as an example and illustrated in the figures for a simplified illustration. The pixel unit 212 includes a pixel electrode 2121 and a thin film transistor (TFT) 2122 that are disposed on the base 211, e.g. a glass substrate, and the pixel electrode 2121 is located in the display area. The first orienting structure 24, TFT 2122, row conductor 213, and column conductor 214 are located on the outside of the display area. Furthermore, a black matrix (not shown) may be provided between two pixel units 212.

The second substrate 22 may be a counter substrate having a base 221, a counter electrode 222, and color filters (not shown), and a black matrix (not shown) may further be provided between two color filters.

A driving circuit (not shown) controls the TFT 2122 through the row conductors 213 and column conductors 214, so that the data can be written into the pixel capacitor formed by the pixel electrode 2121 and the counter electrode 222 that are made of a transparent conductive material, e.g. ITO. The written data induces an electric field on the liquid crystal layer 23 between the first substrate 21 and the second substrate 22.

As shown in FIG. 2B, the first orienting structure 24 is to make some of the liquid crystal molecules 231 in the liquid crystal layer 23 incline toward the internal part of the pixel unit 212, and some other liquid crystal molecules 232 in the liquid crystal layer 23 are vertically aligned.

The predetermined inclined angle formed by the first orienting structure 24 is, for example, between 5 and 80 degrees, such that the orientations of some liquid crystal molecules 231 in the liquid crystal layer 23 change from being perpendicular to the first substrate 21 to incline toward the internal part of the pixel unit 212 about 5 to 80 degrees. The predetermined angle herein is an included angle formed between the long axis of the liquid crystal molecule and the normal line of the first substrate 21.

In the embodiment, the first orienting structures 24, which are, for example but not limited to, convex objects, are disposed around the entire pixel electrode 2121; nonetheless, the first orienting structures 24 may also be concave objects.

In the perspective of the cross sections AA' of the first substrate 21 and the second substrate 22 as shown in FIG. 2B, as the electric field is not applied to the liquid crystal layer 23, some liquid crystal molecules 231 incline on rather than being perpendicular to the first substrate 21 with the affection of the first orienting structure 24, and some other liquid crystal molecules 232 in the liquid crystal layer 23 are roughly perpendicular to the first substrate 21.

The liquid crystal molecule of the liquid crystal layer 23 is a nematic liquid crystal material, e.g. a nematic liquid crystal material with a negative dielectric anisotropy. The liquid crystal molecules may be rotated along an axis and possess the optical rotation characteristics if an optical rotation material, e.g. a chiral material, is added to the liquid crystal layer 23. In order to provide sufficient space for rotating the liquid crystal molecules, the ratio of the thickness of the liquid crystal layer 23 to the chiral pitch ranges from 0.16 to 0.42.

Figure 3:
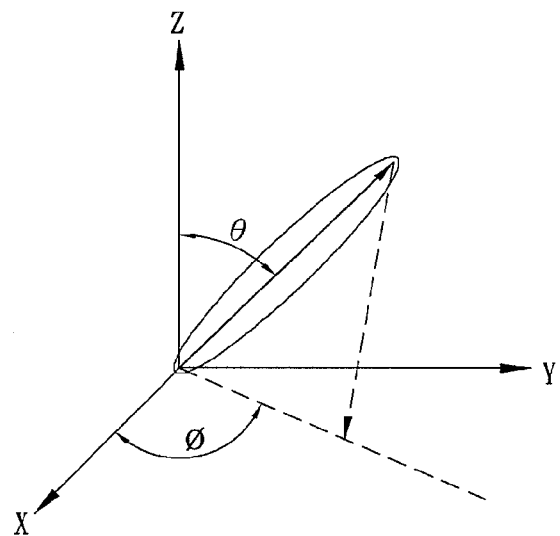
FIG. 3 is a schematic view of a rotating liquid crystal molecule.

As shown in FIG. 3, the rotating angle of the liquid crystal molecules in ψ direction is determined by adjusting the d/p parameter, where p is a chiral pitch, and d is the thickness of the liquid crystal layer 23, the thickness of the cell gap, or the distance between the first substrate 21 and the second substrate 22.

Figure 4:
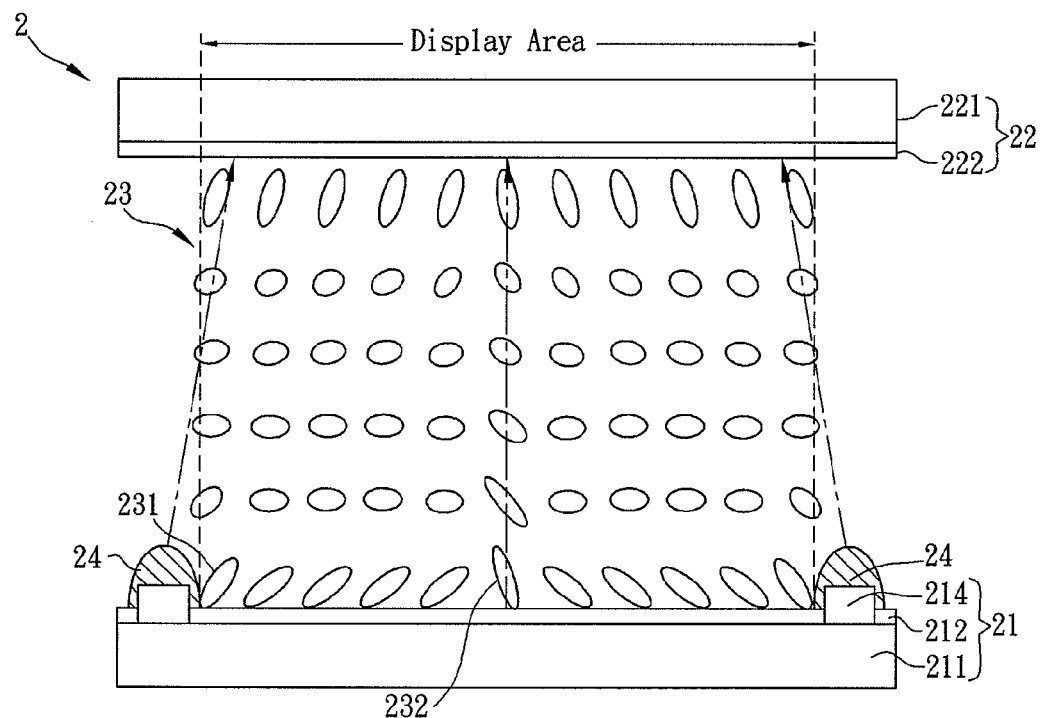
FIGS. 4, 5A, and 5B are schematic views of the LCD device in FIG. 2A, wherein an electric field is applied to the liquid crystal layer.

The first orienting structure 24 provides a pre-inclined direction for the liquid crystal molecules and facilitates a force to align the liquid crystal molecules in a central symmetric shape, and the force may come from, for example, a slanting electric field. FIG. 4 is a schematic view of the LCD device 2 in FIG. 2A, where an electric field is applied to the liquid crystal layer 23. The slanting electric field affects the liquid crystal molecules around the first orienting structure 24, such that the liquid crystal molecules incline toward the internal part of the pixel electrode 2121. The inclination of the liquid crystal molecule varies with the distance between the liquid crystal molecule and the first orienting structure 24; meanwhile, the liquid crystal molecules may be gradually rotated from the first substrate 21 to the second substrate 22 under the influence of the optical rotation material, where the rotating or toppling of the liquid crystal molecule varies based on the intensity of the electric field.

Figure 6A:
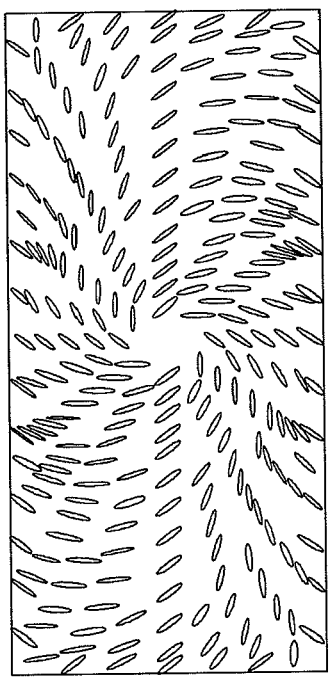
FIGS. 6A to 6C are schematic views of the alignments of different liquid crystal sublayers in FIG. 5B.
Figure 6B:
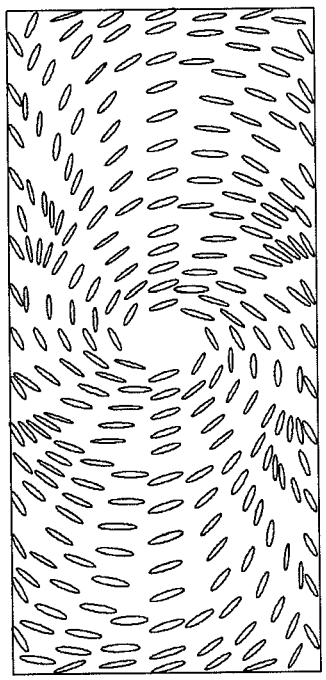
Figure 6C:
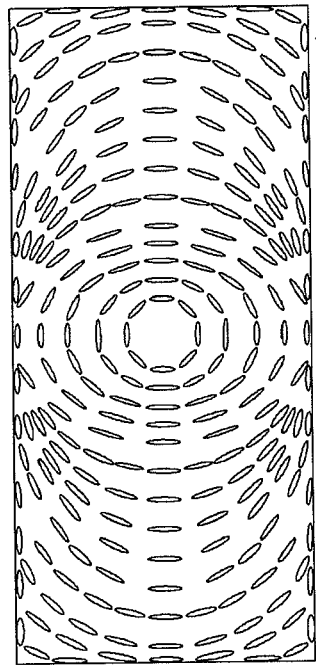

When the electric field is applied to the liquid crystal layer 23, the liquid crystal molecules in the sublayer of the liquid crystal layer 23 gradually incline toward the internal part from the periphery of the pixel electrode 2121, such that the liquid crystal molecules in the sublayer of the liquid crystal layer 23 are aligned in a concentric circular pattern, a spiral pattern, or an annular pattern. For example, the orientations of the liquid crystal molecules in the liquid crystal layer 23 are varied gradually between the first substrate 21 and the second substrate 22 either from the first substrate 21 to the second substrate 22 or another way around. In the display area, the liquid crystal molecules in a sublayer of the liquid crystal layer 23 that is parallel to the first substrate 21 or the second substrate 22 topple down in different orientations instead of the same, and such toppling style of the liquid crystal molecules improves the dependency of the azimuth angle. The shapes of the aligned liquid crystal molecules in each sublayer are shown in FIGS. 6A to 6C. In the embodiment, the light transmission rates in all directions through the liquid crystal molecules in the display area are approximately the same, thus the LCD device 2 of the present invention has a wider viewing angle effect compared to the conventional vertical alignment LCD device.

Figure 5A:
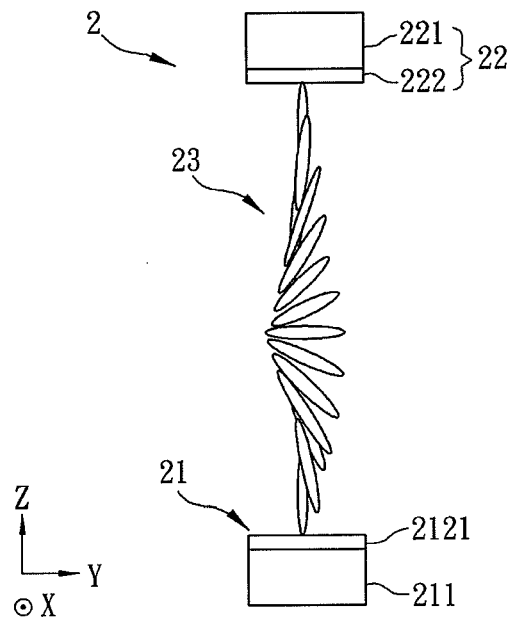

With reference to FIG. 5A, when a weak electric field is applied to the liquid crystal layer 23 as shown in FIG. 4, the liquid crystal molecules in the liquid crystal layer are gradually rotated from the first substrate 21 to the second substrate 22, so the orientations of the liquid crystal molecules are gradually from vertical to horizontal with rotation, and then gradually from horizontal to vertical with rotation. The rotating of the liquid crystal molecules along the normal line of the first substrate 21 varies depending on the intensity of the electric field.

Figure 5B:
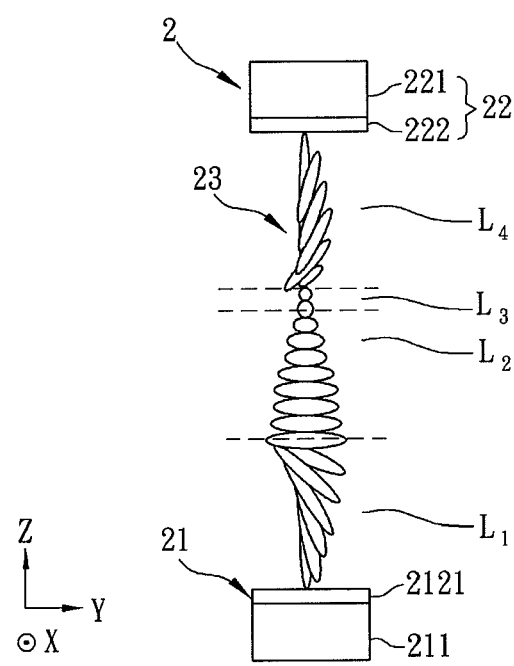

As shown in FIG. 5B, when a strong electric field is applied to the liquid crystal layer 23, the liquid crystal molecules in the liquid crystal layer 23 are gradually rotated from the first substrate 21 to the second substrate 22, so the orientations of the liquid crystal molecules are gradually from vertical to horizontal with rotation, then rotating in horizontal, and then gradually from horizontal to vertical with rotation. In each of the sublayers $L_1$ to $L_4$ of the liquid crystal layer, the shape of the aligned liquid crystal molecules is affected by the optical rotation material and the first orienting structure 24 to different extents, hence the rotating of the liquid crystal molecules in $\psi$ direction in different sublayers are different and the shapes of the aligned liquid crystal molecules in different sublayers are different. For example, when the liquid crystal molecules are toppled down 90 degrees in $\Theta$ direction and rotated 90 degrees in $\psi$ direction, the liquid crystal molecules in the sublayer are aligned in a concentric circular pattern.

When a strong electric field is applied to the liquid crystal layer, the liquid crystal molecules are rotated at least 90 degrees from the first substrate 21 to the second substrate 22, so that the LCD device 2 obtains the advantage of the TN LCD device, which is to enhance the light transmission rate with the optical rotation characteristics of the liquid crystal molecules.

In addition, when a strong electric field is applied to the liquid crystal layer 23, the liquid crystal molecules in the sublayer $L_2$ of the liquid crystal layer 23 are toppled down to flat and rotated on a plane parallel to the first substrate 21, where the rotation varies with the intensity of the electric field.

FIGS. 6A to 6C show the patterns of the sublayers $L_1$ to $L_4$ in the liquid crystal layer 23 of FIG. 5B, respectively. The liquid crystal molecules in each sublayer $L_1$ to $L_4$ are aligned in a concentric circular pattern, a spiral pattern, or an annular pattern, in which the normal line of the first substrate 21 is served as the central axis. In practice, some liquid crystal molecules near the center of the pixel electrode 2121 are aligned in a circular pattern, while some other liquid crystal molecules near the periphery of the pixel electrode 2121 are aligned in the border shape thereof; for example, if the pixel electrode 2121 is rectangular, the liquid crystal molecules near the periphery of the pixel electrode 2121 are aligned in the rectangular shape.

The slanting electric field formed by the first orienting structure makes the liquid crystal molecules align in a central symmetric shape, and causes the liquid crystal molecules in different sublayers $L_1$ to $L_4$ align in the central symmetric shapes that are not exactly the same with each other. The liquid crystal molecules in the sublayers $L_1$ to $L_4$ that are closer to the first orienting structure 24 are aligned in a spiral shape, and those in an inner area of the sublayers $L_1$ to $L_4$ that are farther from the first orienting structure are aligned in a concentric circular shape, while those in an outer area thereof are aligned in a shape as the periphery of the pixel unit 212.

In addition, these liquid crystal molecules in different sublayers between the first substrate 21 and the second substrate 22 are affected by the electric field and are aligned in a three-dimensional central symmetric shape FIGS. 6A to 6C are schematic views of the alignment of different liquid crystal sublayers $L_1$ to $L_4$ of FIG. 5B. As shown in FIG. 6A, the lower sublayer $L_1$ is highly effected by the first orienting structure 24, to be specific, when a high voltage is applied, the liquid crystal molecules in the sublayer $L_1$ are affected by the adjacent first orienting structure 24 in $\Theta$ direction relative to Z-axis, such that the liquid crystal molecules are toppled down toward the center of the pixel unit 212. These liquid crystal molecules are rotated clockwise or counterclockwise in $\psi$ direction on the X-Y plane depending on the optical rotation material, such that the liquid crystal molecules are aligned in a spiral shape, for example, they are distributed in a spiral shape about an axis that is the normal line of the first substrate 21.

With reference to FIGS. 6B and 6C, the affection to the liquid crystal molecules of the upper sublayer by the first orienting structure 24 is gradually decreased. For the continuity in alignment of the liquid crystal molecules, the toppling phenomenon of the liquid crystal molecules toward the center of the pixel unit 212 in $\Theta$ direction is gradually decayed, and in $\psi$ direction the liquid crystal molecules are rotated clockwise or counterclockwise by the optical rotation material, such that they are aligned in a shape close to a concentric circle or a concentric circular shape.

As shown in FIG. 6B, because the liquid crystal molecules in the sublayer $L_2$ are still affected by the first orienting structure 24 and not as much as in the sublayer $L_1$, the distributed shape thereof is spiral and closer to a concentric circle than the shape of the aligned liquid crystal molecules in the sublayer $L_1$.

With reference to FIG. 6C, the first orienting structure 24 has less effect on the upper sublayer $L_3$, so that the liquid crystal molecules in the sublayer $L_3$ are distributed as a concentric circle about the axis that is the normal line of the first substrate 21.

The alignment and distribution of the liquid crystal molecules in the sublayer $L_4$ are similar to the spiral distribution of the liquid crystal molecules in the sublayer $L_1$, thus a detailed description thereof is omitted.

In the embodiment, the LCD device 2 is a LCD panel, in which the liquid crystal molecules of the liquid crystal layer 23 are mostly aligned vertically without the presence of an electric field; so that the LCD device 2 has the advantage of a MVA LCD device to provide the normal black with sufficient darkness. Also, since the first orienting structure 24 is disposed on the outside of the display area, the liquid crystal molecules topple down toward the inner part of the pixel electrode. Meanwhile, the optical rotation material is added to the liquid crystal layer 23 and causes the liquid crystal molecules to rotate, such that the liquid crystal molecules aligned in a spiral shape or in a concentric circular shape will not generate a singular point at any position, and this prevents the singular points that cause the visual defect from generating in the display area and enhances the aperture ratio. In addition, while a voltage is applied to the liquid crystal molecules, they tend to topple down toward the inner part of the pixel electrode from the periphery of the pixel electrode, whereas the liquid crystal molecules in the liquid crystal layer are squeezed and aligned in a symmetric shape.

Additionally, because the liquid crystal molecules with the optical rotation material hold the optical rotation characteristics, the light transmission rate may be increased while the liquid crystal molecules are twisted, and the contrasts increases in normal black for the liquid crystal molecules have a low light transmission rate.

Although the LCD device 2 is a simple structure as described above, a high display quality of the wide viewing angle and high contrast can still be achieved.

In addition, the light leakage area of the pixel caused by the orienting structure is smaller than that caused by the conventional wide viewing angle technology, so the black matrix is not necessarily to be disposed on the first substrate 21, thereby expanding the effective display area and increasing the aperture ratio.

The first orienting structure 24 in the embodiment is illustrated as a convex object as an example but not limited to this; it may also be a concave object. Alternatively, the first orienting structure 24 may further be formed by the row conductor or the column conductor on the first substrate, or by the gap of the pixel electrode.

The disposition of the alignment device will be illustrated with reference to the following embodiment.

FIGS. 7A to 7D are schematic views of a LCD device 2a. With reference to FIGS. 7A to 7D, the first substrate 21 further includes a first alignment device 215, which is disposed above the pixel electrode 2121 and roughly parallel to the first substrate 21. The first alignment device 215 is to dispose the liquid crystal molecules 232 along the normal line of the first alignment device 215, so the liquid crystal molecules 232 are approximately perpendicular to the surface of the first alignment device 215 and the liquid crystal molecules 231 close to the first orienting structure 24 may incline toward a specific direction so as to form a predetermined inclined angle can be formed.

Figure 7A:
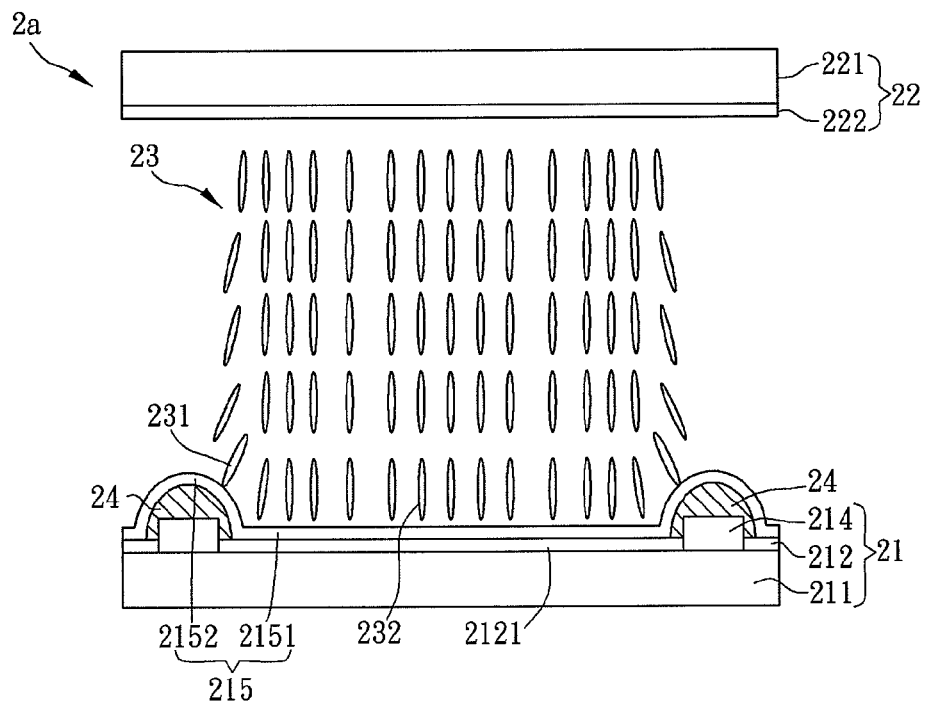
FIGS. 7A to 7D are schematic views of a LCD device according to another embodiment of the present invention.

As shown in FIG. 7A, the first alignment device 215 covers the first orienting structure 24, so that some of the liquid crystal molecules 231 of the liquid crystal layer 23 incline toward the inner part of the pixel unit 212 and some liquid crystal molecules 232 are aligned vertically.

In the alignment device 215, a part 2151 is disposed in parallel on the pixel electrode 2121 for forcing the liquid crystal molecules 232 to align in a direction roughly perpendicular to the first substrate 21; and another part 2152 covers the first orienting structure 24. In another aspect, the part 2152 is affected by the first orienting structure 24, so the liquid crystal molecules 231 incline on rather than being perpendicular to the first substrate 21. In other words, the first orienting structure 24 makes some liquid crystal molecules 231 of the liquid crystal layer 23 incline toward the inner part of the pixel unit 212.

Figure 7B:
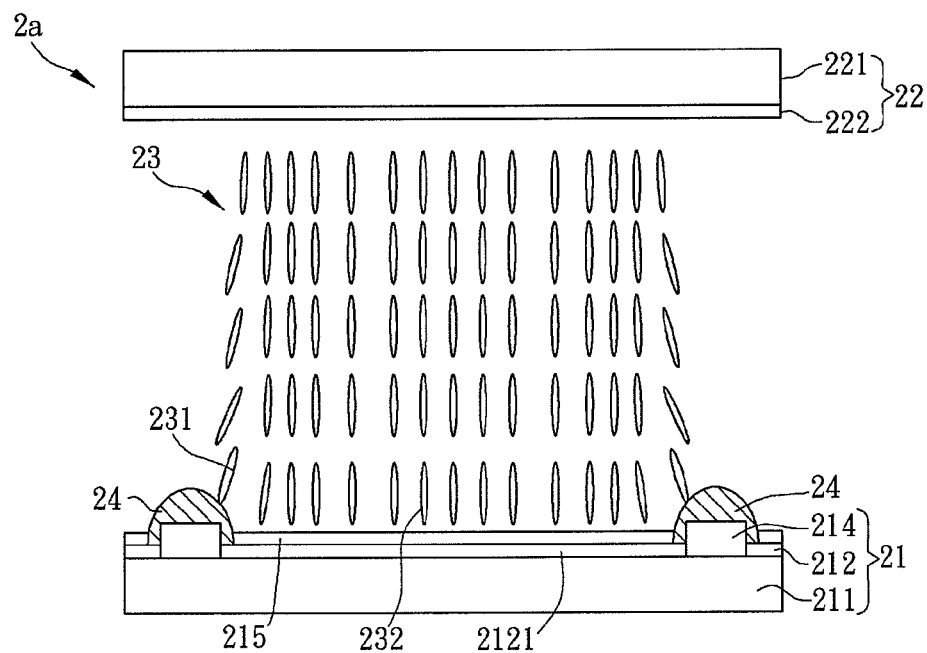

In another aspect as shown in FIG. 7B, the first alignment device 215 does not cover the first orienting structure 24, so that some liquid crystal molecules 231 of the liquid crystal layer 23 incline with the affection of the first orienting structure 24 and some liquid crystal molecules 232 are aligned vertically.

Figure 7C:
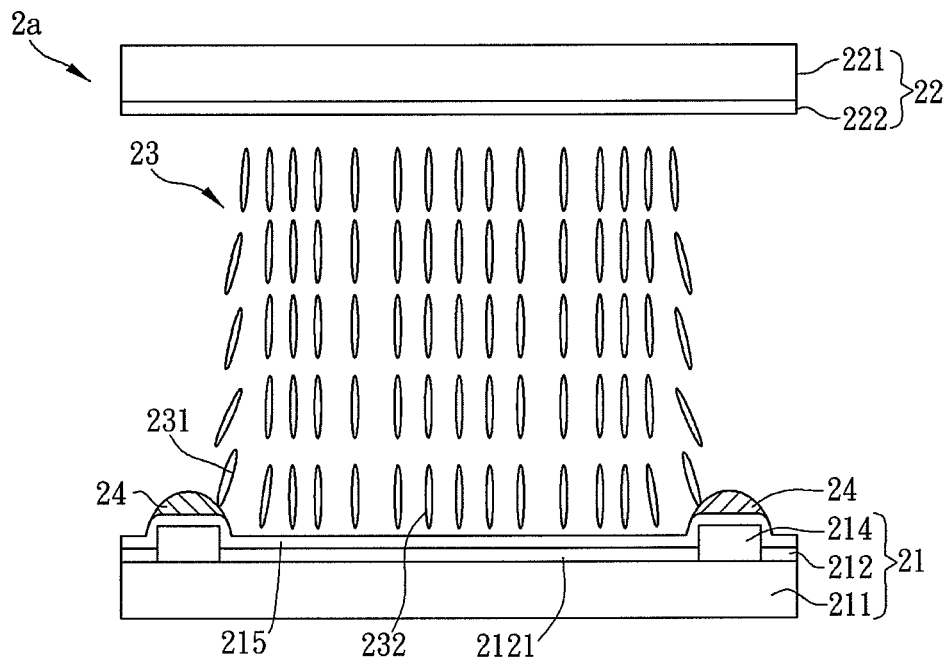

In yet another aspect as shown in FIG. 7C, the first alignment device 215 is disposed between the first orienting structure 24 and the pixel electrode. The first orienting structure 24 is disposed on the surface of the first alignment device 215, so that some liquid crystal molecules of the liquid crystal layer 23 incline with the affection of the first orienting structure 24 and some liquid crystal molecules 232 are aligned vertically.

Although it is shown in FIGS. 7A to 7C that the first substrate 21 has an alignment device and the second substrate 22 does not have one, it is not limited to this. The second substrate 22 may still have an alignment device.

Figure 7D:
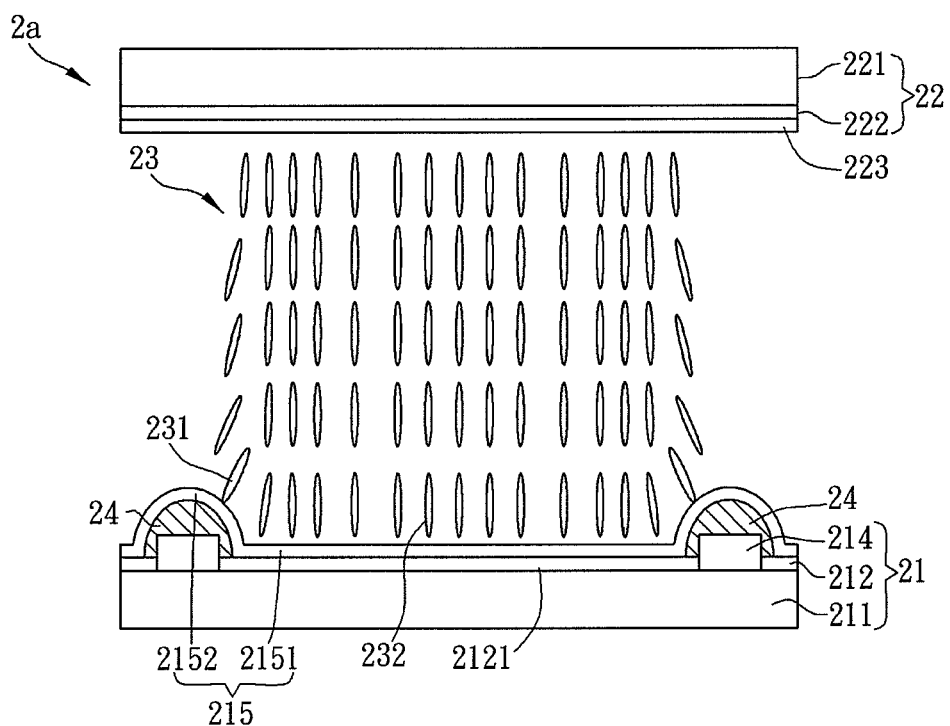

As shown in FIG. 7D, the second substrate 22 further includes a second alignment device 223 that forces the liquid crystal molecules to align in the direction of the normal line of the second alignment device 223, so that the liquid crystal molecules are roughly perpendicular to the surface of the second alignment device 223. The second substrate 22 in FIG. 7D can be referred to the second substrate 22 in FIGS. 7B and 7C, thus a detailed description thereof is omitted.

Additionally, even though the first substrate 21 does not have an alignment device, the second substrate 22 may still have one.

Figures 8A, 8B:
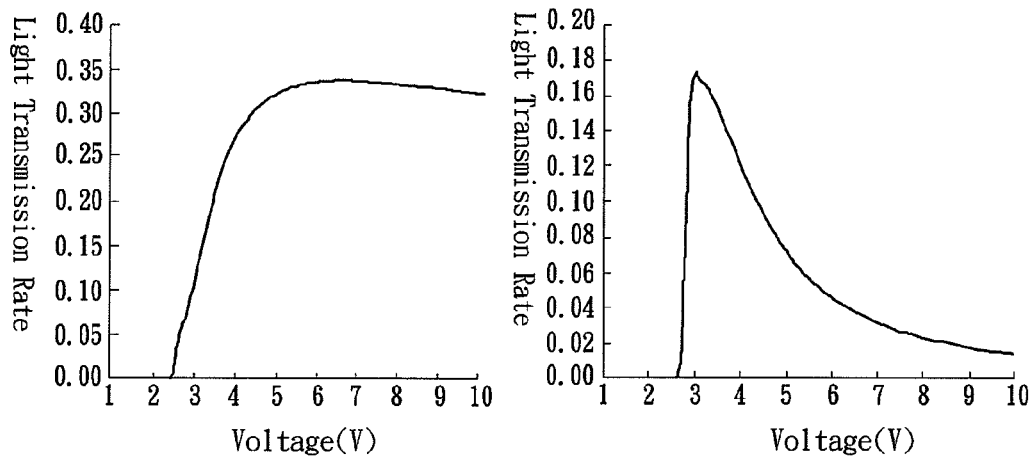
FIGS. 8A and 8B are graphs of voltage vs. light transmission rate of the LCD device in FIG. 7D.

The graph of voltage vs. light transmission rate of the LCD device 2a is shown in FIG. 8A.

It is apparent that the light transmission rate of the LCD device 2 in FIG. 8A is higher than that of the conventional vertical alignment LCD device in FIG. 8B. When the voltage is higher than 4V, the light transmission rate of the conventional alignment LCD device starts dropping because the phase difference exceeds $(m+1/2)\pi$ (m is any integer), thereby narrowing the operation range of the voltage.

When the voltage is higher than 4V, the transmission rate of the LCD device 2 with the optical rotation characteristics continues to increase, thereby broadening the operation range of the voltage.

In the following description, the LCD device 2b is used as a monitoring device.

Figure 9:
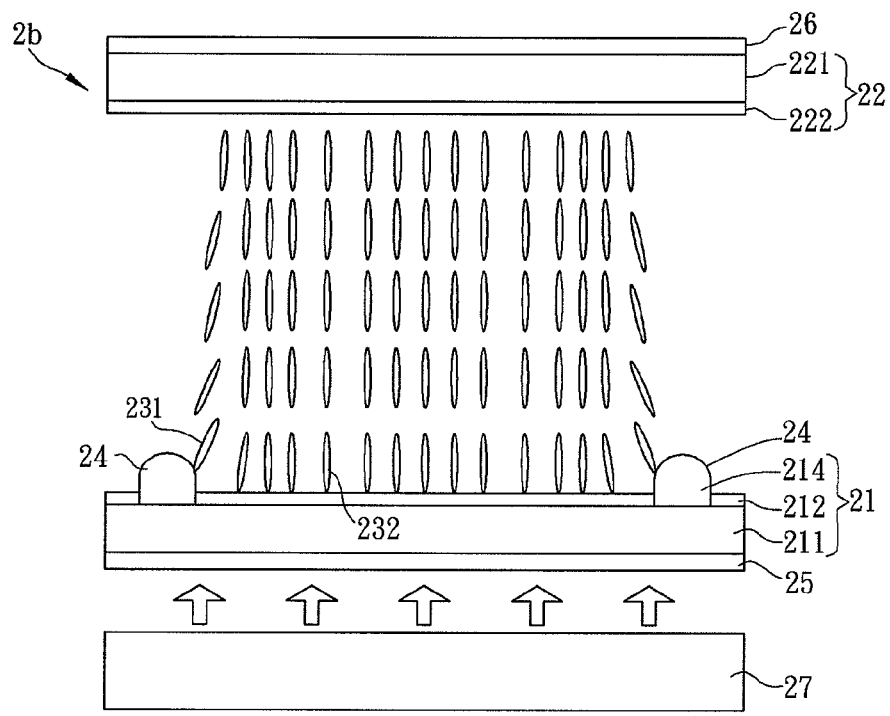
FIG. 9 is a schematic view of a LCD device according to another embodiment of the present invention.

FIG. 9 is a schematic view of a LCD device 2b. With reference to FIG. 9, the LCD device 2b further includes a first polarizing plate 25 disposed on the first substrate 21, a second polarizing plate 26 disposed on the second substrate 22, and a backlight source 27 facing the first substrate 21. The light emitted from the backlight source 27 passes through in the order of: the first polarizing plate 25, the first substrate 21, the liquid crystal layer 23, the second substrate 22, and the second polarizing plate 26, where the polarization axes of the first polarizing plate 25 and the second polarizing plate 26 are perpendicular to each other.

In this configuration, the LCD device 2b is default as normal black, that is, when an electric field does not exist between the first substrate 21 and the second substrate 22, the liquid crystal molecules will not be twisted or toppled down, so the light is filtered out by the two polarizing plates. When an electric field exists between the first substrate 21 and the second substrate 22, the liquid crystal molecules will be twisted or toppled down, so that a part of the light is not filtered out by the polarizing plates.

Most of the liquid crystal molecules are aligned vertically between the first substrate 21 and the second substrate 22 before an electric field is applied, such that the liquid crystal molecules would have a similar characteristic with the vertical alignment LCD device and thus a normal black state with low light leakage effect can be obtained. When an electric field is applied, however, the liquid crystal molecules are not only toppled down in $\Theta$ direction but also rotated in $\psi$ direction. Because the liquid crystal molecules of the conventional vertical alignment LCD device are only toppled down in $\Theta$ direction while a voltage is applied, the liquid crystal molecules perpendicular or parallel to the polarization axis of the polarizing plate do not have any effect on the light transmission rate at all. Compared to the above, the liquid crystal layer in the embodiment is designed to rotate 90 degrees in $\psi$ direction and the optical rotation characteristics may be used again in the structure where the polarization axes of the first polarizing plate 25 and the second polarizing plate 26 are perpendicular to each other for improving the disadvantages of the conventional vertical alignment LCD device and obtaining a higher light transmission rate.

The following examples are used to illustrate variant orienting structures.

Figure 10A:
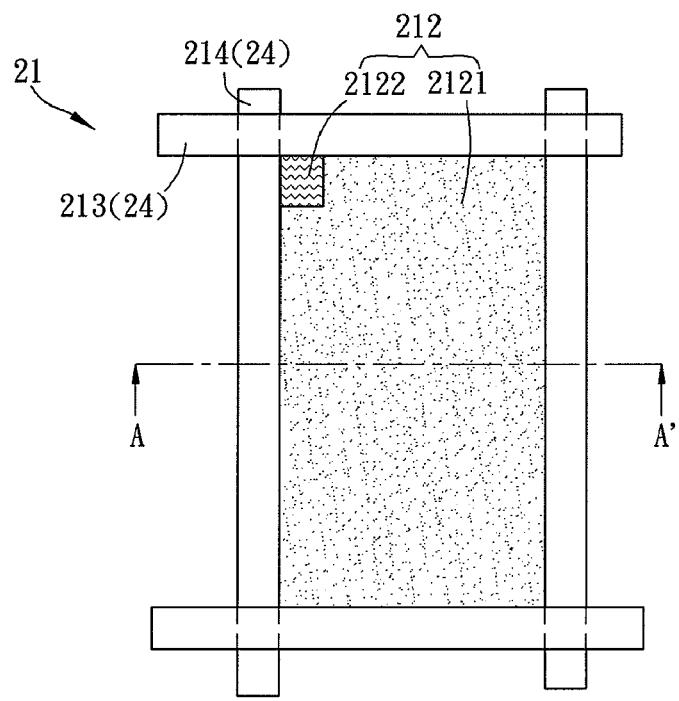
FIGS. 10A and 10B are schematic views of a LCD device according to another embodiment of the present invention.
Figure 10B:
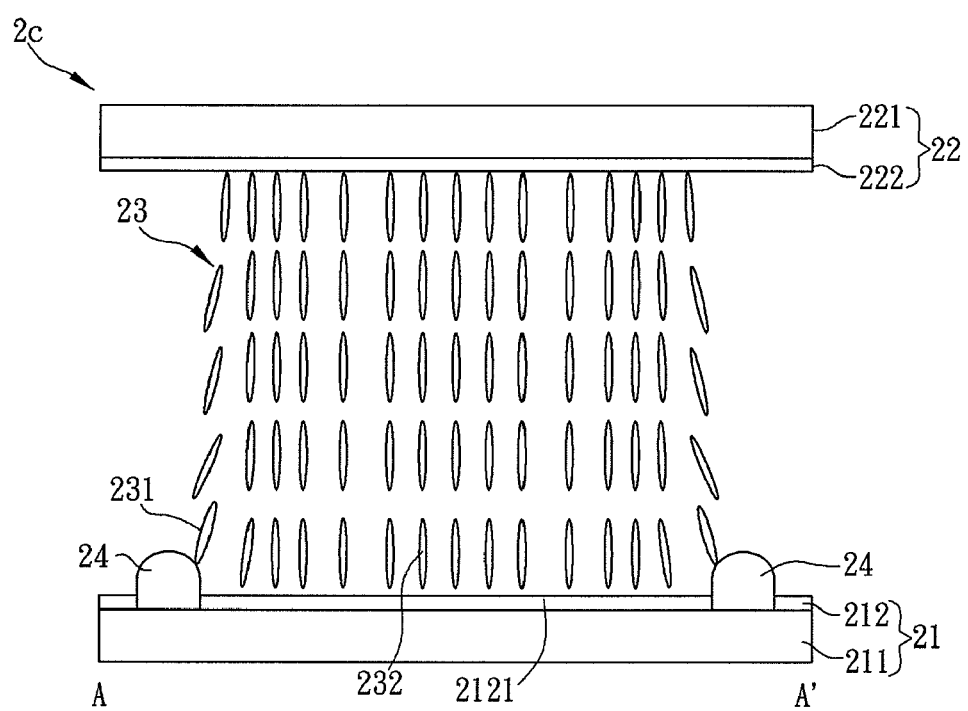

FIGS. 10A and 10B are schematic views of a LCD device 2c. Other than the convex object mentioned in the previous embodiment, with reference to FIGS. 10A and 10B, the row conductor 213 or the column conductor 214 may be used as the first orienting structure 24 in the LCD device 2c. For instance, the thicknesses of the row conductor 213 and the column conductor 214 are larger than the pixel electrode 2121, which is similar to having a wall placed in the pixel unit 212. In addition, in the cross-sectional view from the first substrate 21 to the second substrate 22, the top surfaces and the side surfaces of the row conductor 213 and the column conductor 214 are not exactly perpendicular to each other and an inclined surface or a curved surface may also exist between the top surface and the side surface of the conductor as shown in FIG. 10B. Thus, the row conductor 213 and the column conductor 214 with the inclined surface or the curved surface may be directly used as the convex object so as to achieve the effect as described in the above-mentioned embodiment.

In addition, the LCD device in the embodiment may also include an alignment device, which may cover the conductor having the inclined surface or the curved surface, or may not cover the conductor at all. FIGS. 7A to 7D already illustrate various aspects of the alignment device and the conductor having the inclined surface or the curved surface that is similar to the first orienting structure in the above-mentioned embodiment, thus a detailed description thereof will be omitted.

FIGS. 11A to 11F illustrate additional various aspects of the first orienting structure. Because it is to mainly illustrate the position change of the first orienting structure, only the first orienting structure 24, pixel electrode 2121, and TFT 2122 are shown, and the row conductor 213 and the column conductor 214 are not shown herein.

With reference to FIGS. 11A to 11F, the first orienting structure 24 may be manufactured by a flat layer and one or more first orienting structures 24 are disposed around the pixel electrode 2121; for example, the pattern of the first orienting structure 24 may be the wall encircling the pixel electrode 2121. Alternatively, a plurality of first orienting structures 24 may be disposed adjacent to a pixel electrode 2121 such as located at least two corners, at least two sides, or at least one corner and at least one side of the pixel electrode 2121.

A flat layer is formed on the first substrate 21 and etched at the part where the orienting structure is not disposed pre-determinedly after the TFT, row conductor, column conductor, and pixel electrode of the first substrate 21 are formed, and the remaining flat layer will thus form a convex first orienting structure 24. On the other hand, if the flat layer is etched at the part where the orienting structure is disposed pre-determinedly and the remaining flat layer is kept, a concave first orienting structure 24 is formed at the part of the flat layer where it is etched.

Figure 11A:
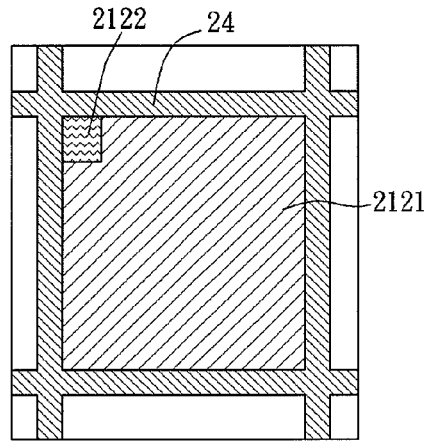
FIGS. 11A to 11H are schematic views of variations of an orienting structure according to another embodiment of the present invention.

As shown in FIG. 11A, the first orienting structures 24 are disposed around the pixel electrode 2121. When the electric field is not applied to the liquid crystal layer, the first orienting structure 24 makes the liquid crystal molecules pre-incline toward the inner part of the pixel electrode 2121. On the contrary, when the electric field is applied to the liquid crystal layer, the liquid crystal molecules are toppled down toward the center of the pixel electrode from the periphery of the pixel electrode 2121, so that the liquid crystal molecules in different layers are aligned in a central symmetric spiral shape or a concentric circular shape.

Figure 11B:
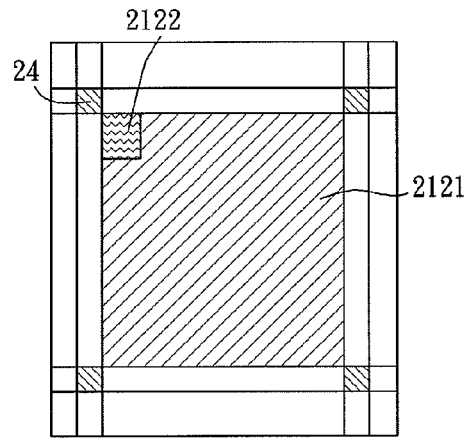
Figure 11C:
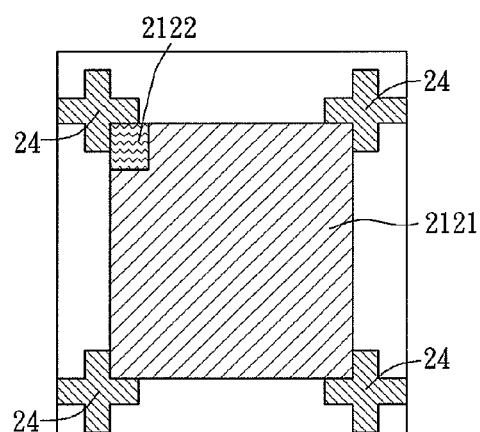

Additionally, a plurality of first orienting structures 24 that are not connected to each other are separately disposed adjacent to the pixel electrode 2121 as shown in FIGS. 11B and 11C. The first orienting structures 24 are disposed in four regions around the pixel electrode 2121 and the regions may be in any form, e.g. a cross shape or a cylindrical shape rather than encircling the pixel electrode 2121 as shown in FIG. 11A. The first orienting structure 24 located adjacent to the four corners of the pixel electrode 2121 will affect ¼ of the pixel electrode 212. When the electric field is applied to the liquid crystal layer, the liquid crystal molecules are toppled down toward the center of the pixel electrode 2121 from the periphery of the pixel electrode 2121, hence the liquid crystal molecules in different layers are aligned in a central symmetric spiral shape or in a concentric circular shape.

Other than being disposed at the corners, more orienting structures may further be disposed on the edge of the pixel unit. By adding more first orienting structures 24, the liquid crystal molecules may form more central symmetric shapes with small sizes in the pixel so to decrease the dependency of the LCD device 2 for the azimuth angle.

Figure 11D:
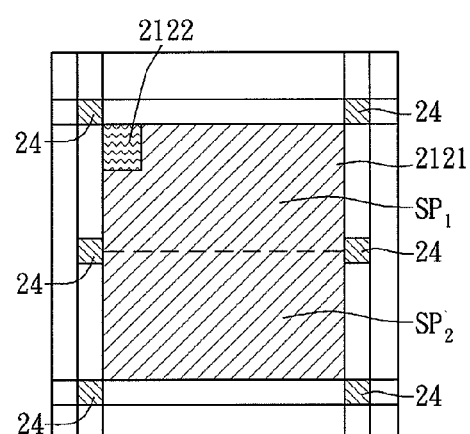
Figure 11E:
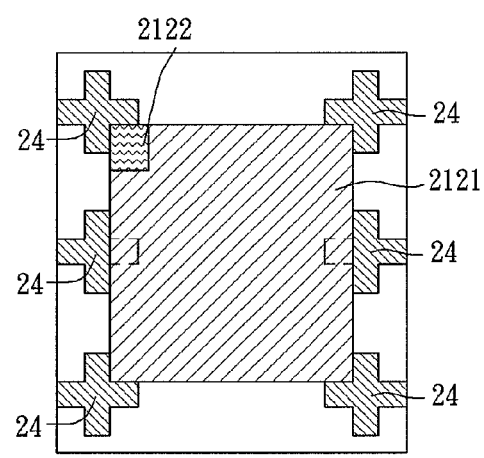

With reference to FIGS. 11D and 11E, a plurality of first orienting structures 24 are disposed on one side of the pixel unit 212, thereby dividing the pixel unit 212 into a plurality of sub-pixel areas $SP_1$ and $SP_2$, where the first orienting structures 24 are disposed at the corners of the sub-pixel area $SP_1$ and $SP_2$. When the electric field is applied to the liquid crystal layer 23, the liquid crystal molecules in each of the sub-pixel areas $SP_1$ and $SP_2$ are aligned in a concentric circular pattern, a spiral pattern, or an annular pattern as shown in FIGS. 6A to 6C.

Figure 11F:
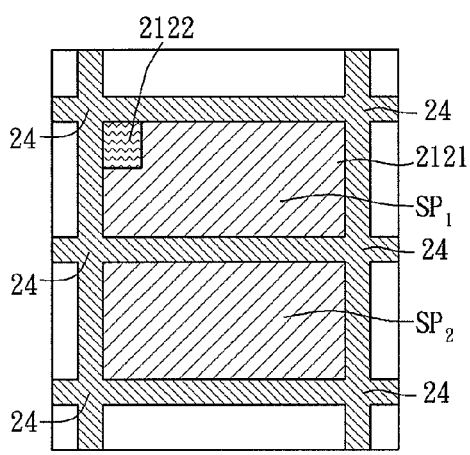

As shown in FIG. 11F, the first orienting structures 24 may be a wall formed on the flat layer to encircle two sub-pixel areas $SP_1$ and $SP_2$ of the pixel unit 212. When the electric field is applied to the liquid crystal layer 23, the liquid crystal molecules in each of the sub-pixel areas $SP_1$ and $SP_2$ are aligned in a concentric circular pattern, a spiral pattern, or an annular pattern as shown in FIGS. 6A to 6C.

Figure 11G:
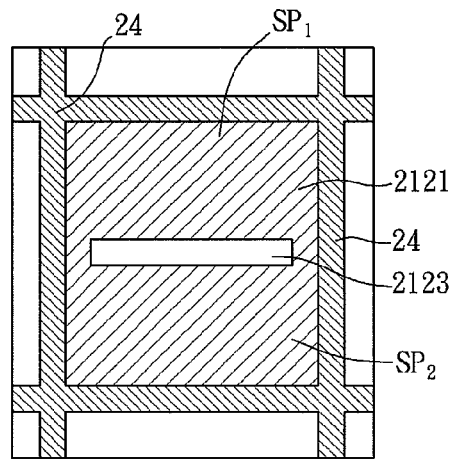
Figure 11H:
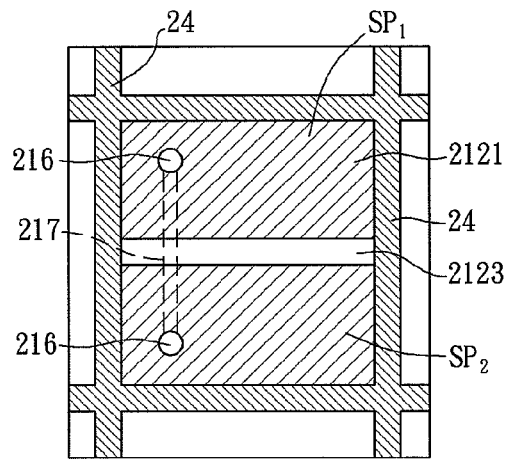

With reference to FIGS. 11G and 11H, the orienting structure is, for example, formed by the gap of the pixel electrode 2121. In FIG. 11G, a gap 2123 formed in the center of the pixel electrode 2121 is used as an orienting structure and does not cut off the pixel electrode 2121, such that the pixel electrode 2121 is still in one piece. The pixel unit can be divided into a plurality of sub-pixel areas $SP_1$ and $SP_2$ by the gap 2123, and the gap 2123 cooperates with the first orienting structure 24 on the edge of the pixel unit 212. When the electric field is applied to the liquid crystal layer 23, the liquid crystal molecules in each of the sub-pixel areas $SP_1$ and $SP_2$ are aligned in a concentric circular pattern, a spiral pattern, or an annular pattern as shown in FIGS. 6A to 6C.

With reference to FIG. 11H, the pixel unit 212 is divided into a plurality of sub-pixel areas $SP_1$ and $SP_2$ by the gap 2123, the pixel electrode 2121 is disposed in the sub-pixel areas $SP_1$ and $SP_2$, respectively, and two conductive plugs 216 are disposed in the pixel electrodes 2121 in the sub-pixel areas $SP_1$ and $SP_2$, respectively. A wire 217 is buried under these two pixel electrodes 2121 that are connected with each other through the conductive plug 216 and the wire 217.

Figure 12:
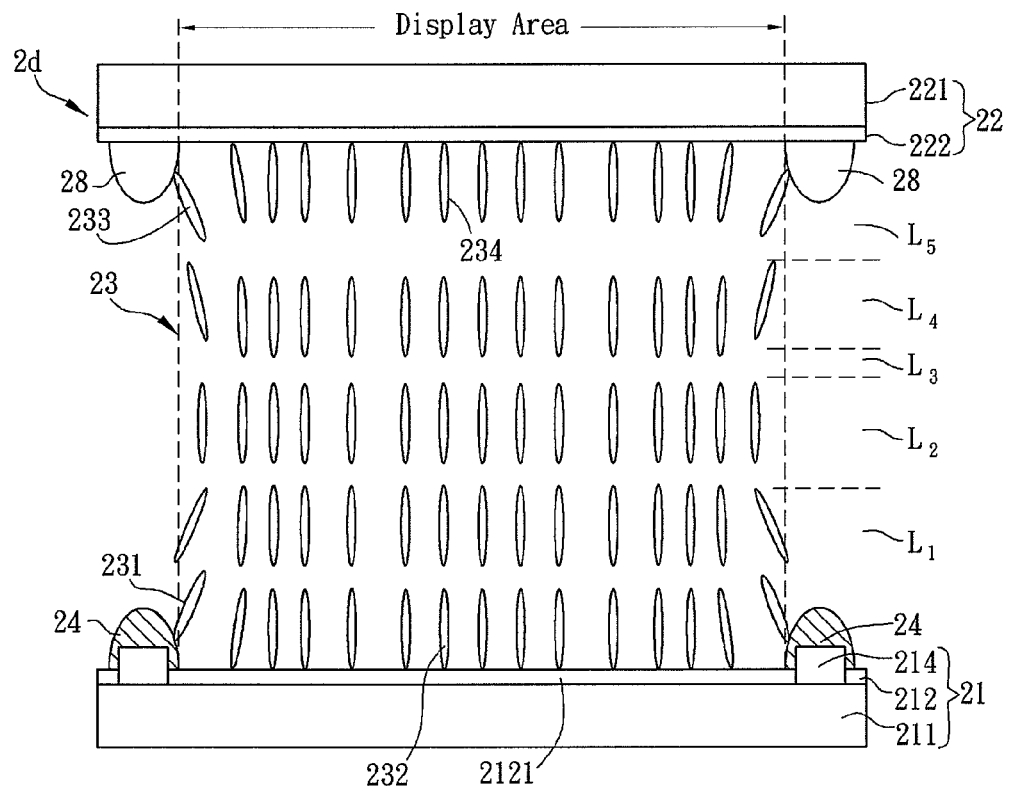
FIGS. 12 and 13 are schematic views of a LCD device according to another embodiment of the present invention.

In addition, in another embodiment as shown in FIG. 12, a LCD device 2d further includes a second orienting structure 28 that forces some liquid crystal molecules 233 of the liquid crystal layer 23 to incline toward the inner part of the pixel unit 212.

The function of the second orienting structure 28 is similar to that of the first orienting structure 24 and it is shown as follows. The pre-inclined angle caused by the second orienting structure 28 is between 5 degrees and 80 degrees, so that some liquid crystal molecules 233 of the liquid crystal layer 23 changes to incline toward the inner part of the pixel unit 212 rather than being perpendicular to the second substrate 22. For example, when the electric field is applied to the liquid crystal layer 23, some liquid crystal molecules 231 and 233 of the liquid crystal layer incline with the affection of the first orienting structure 24 and the second orienting structure 28 and some liquid crystal molecules 232 and 234 are roughly perpendicular to the first substrate 21 and the second substrate 22.

The second orienting structure 28 is a convex object or a concave object that may be formed by the black matrix, additional element, or gap of the counter electrode 222 of the second substrate 22.

The second orienting structure 28 is located outside the display area and its position may correspond to the first orienting structure. The first orienting structure 24 and the second orienting structure 28 may be disposed alternately between the second substrate 22 and the first substrate 21. For example, one first orienting structure 24 is disposed between two second orienting structures 28; otherwise, a second orienting structure 28 is disposed between two first orienting structures 24.

When the electric field is applied to the liquid crystal layer 23, the liquid crystal molecules are gradually rotated from the first substrate 21 to the second substrate 22. The liquid crystal molecules in the sublayer of the liquid crystal layer 23 are gradually toppled down toward the inner part of the pixel electrode 2121 from its periphery, such that the liquid crystal molecules are aligned in a concentric circular pattern, a spiral pattern, or an annular pattern. For example, in the view from the first substrate 21 to the second substrate 22, the liquid crystal layer 23 changes from the first substrate 21 to the second substrate 22 layer-by-layer. In the display area, the liquid crystal molecules in a sublayer parallel to the first substrate 21 or the second substrate 22 in the liquid crystal layer 23 are toppled down in different orientations rather than one and the shape of the aligned liquid crystal molecules in each sublayer are shown in FIGS. 6A to 6C. For example, the liquid crystal sublayers $L_1$ and $L_5$ are shown in FIG. 6A; the liquid crystal sublayer $L_2$ and $L_4$ are shown in FIG. 6B; the liquid crystal layer $L_3$ is shown in FIG. 6C. The toppling styles of these liquid crystal molecules may improve the dependency of the azimuth angle and the light transmission rates of the liquid crystal molecules in all azimuth angles are approximately the same in the display area, thus the LCD device in the embodiment has a wider viewing angle effect compared to the conventional vertical alignment LCD device.

Figure 13:
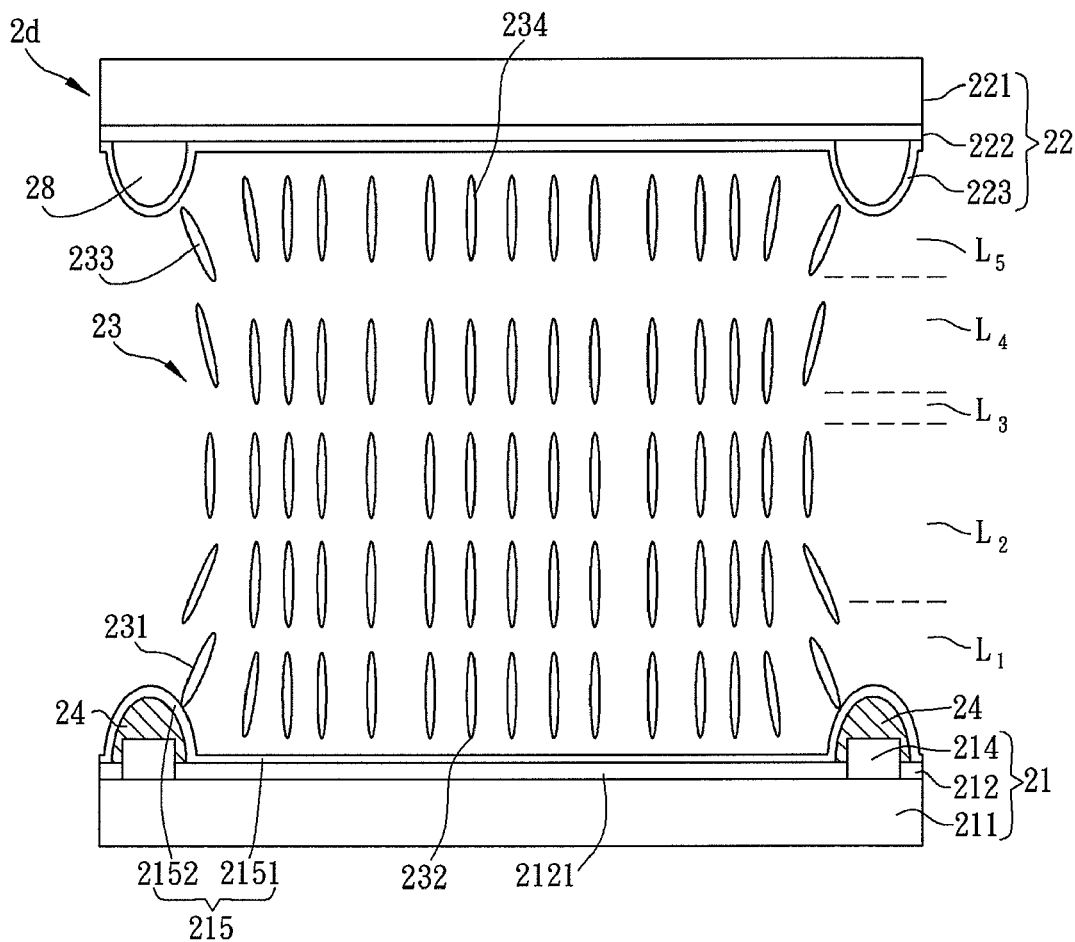

As shown in FIG. 13, the second substrate 22 includes a second alignment device 223 that makes the liquid crystal molecules dispose along the normal line of the second alignment device 223, such that the liquid crystal molecules are roughly perpendicular to the surface of the second alignment device 223.

The second alignment device 223 covers the second orienting structure 23, so that some liquid crystal molecules 223 of the liquid crystal layer 23 incline toward the inner part of the pixel unit 212, and some liquid crystal molecules 234 are aligned vertically.

On the other hand, the second alignment device 223 may not cover the second orienting structure 28, so that some liquid crystal molecules incline only with the affection of the first orienting structure 24 and the second orienting structure 28. Additionally, the second alignment device 223 may be disposed between the second orienting structure 28 and the counter electrode 222.

In the above-mentioned embodiments, it is not limited that the first alignment device 215 and the second alignment device 223 cover the first orienting structure 24 and the second orienting structure 28, respectively, and they may individually have other various aspects as mentioned above.

In another embodiment as shown in FIG. 14, the LCD device 2e includes a first orienting structure 24a, which is a concave object formed by the concave part of a flat layer, thereby forcing some liquid crystal molecules 231 of the liquid crystal layer 23 to incline toward the outer part of the pixel unit 212 and some liquid crystal molecules 232 are aligned vertically.

The pre-inclined angle formed by the first orienting structure 24a is, for example, between 5 degrees and 80 degrees, such that some liquid crystal molecules 231 in the liquid crystal layer 23 change from being perpendicular to the first substrate 21 to incline toward the outer part of the pixel unit 212 about 5 to 80 degrees. Herein, the pre-inclined angle is an included angle between the long axis of the liquid crystal molecule 231 and the normal line of the first substrate 21.

Figure 14A:
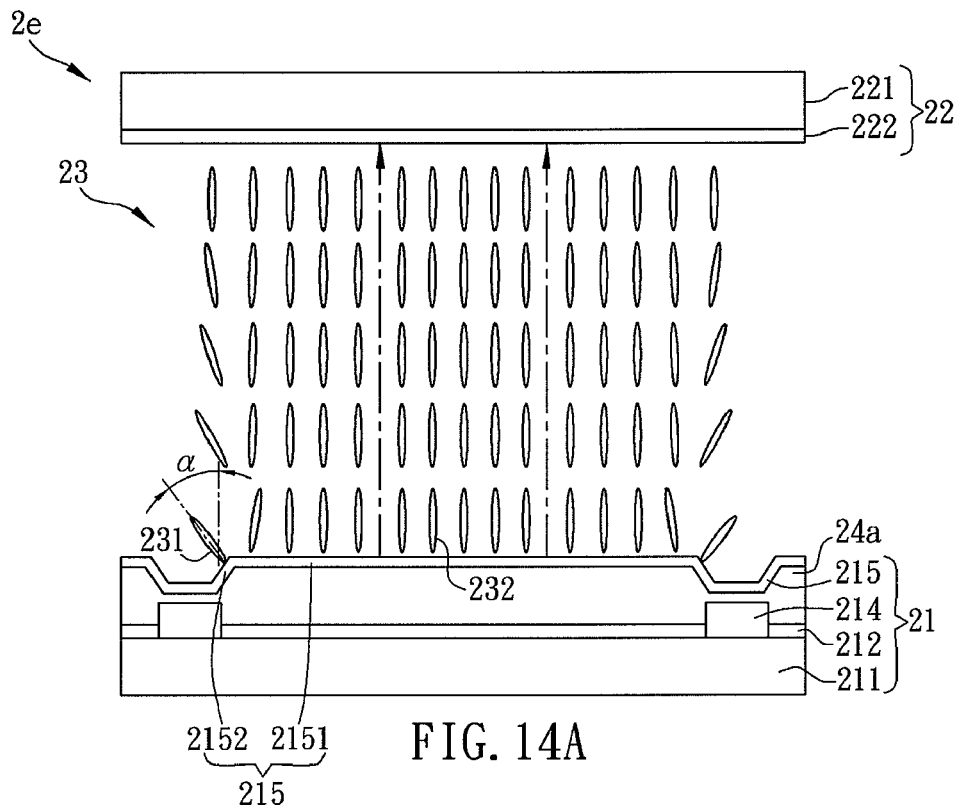
FIGS. 14A to 16 are schematic views of a LCD device according to another embodiment of the present invention.
Figure 14B:
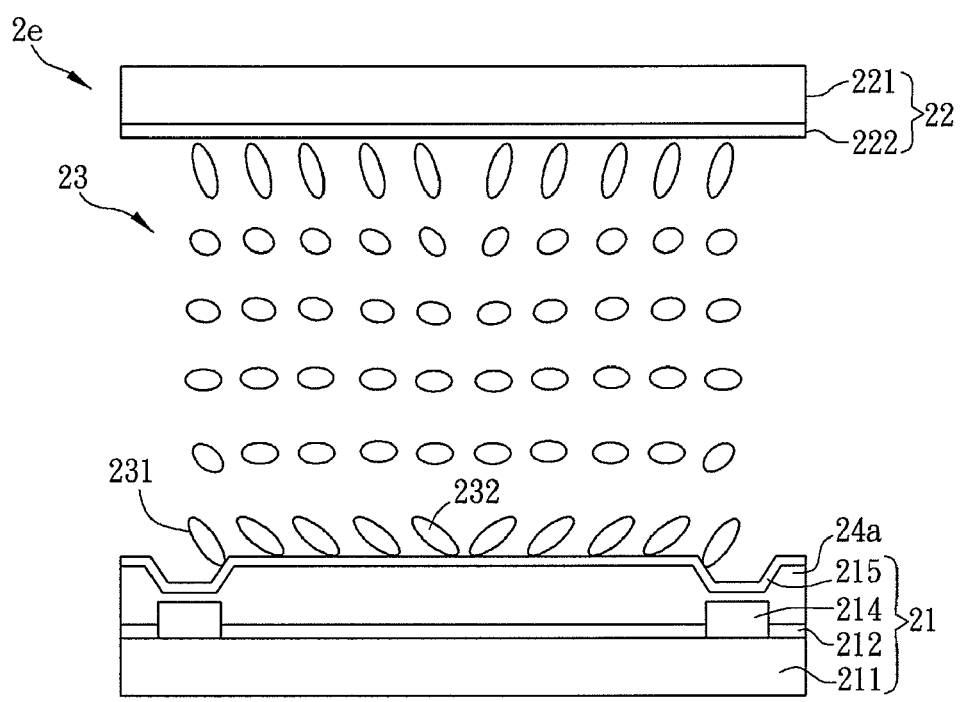

With reference to FIG. 14B, when the electric field is applied to the liquid crystal layer 23, the liquid crystal molecules are gradually rotated from the first substrate 21 to the second substrate 22. The liquid crystal molecules in the sublayer of the liquid crystal layer 23 are gradually toppled down toward the inner part of the pixel electrode 2121 from its periphery, such that the liquid crystal molecules are aligned in a concentric circular pattern, a spiral pattern, or an annular pattern. The shapes of the aligned liquid crystal molecules in each sublayer are shown in FIGS. 6A to 6C, so a detailed description thereof will be omitted.

Referring again to FIGS. 14A and 14B, the first substrate 21 further includes a first alignment device 215, which covers the first orienting structure 24a, so that some liquid crystal molecules 231 incline toward the outer part of the pixel unit 212 so as to generate a pre-inclined angle. The first alignment device 215 disposes the liquid crystal molecules 232 in the direction of the normal line of the first alignment device 215, so that the liquid crystal molecules 232 are roughly perpendicular to the surface of the first alignment device 215.

Figure 15:
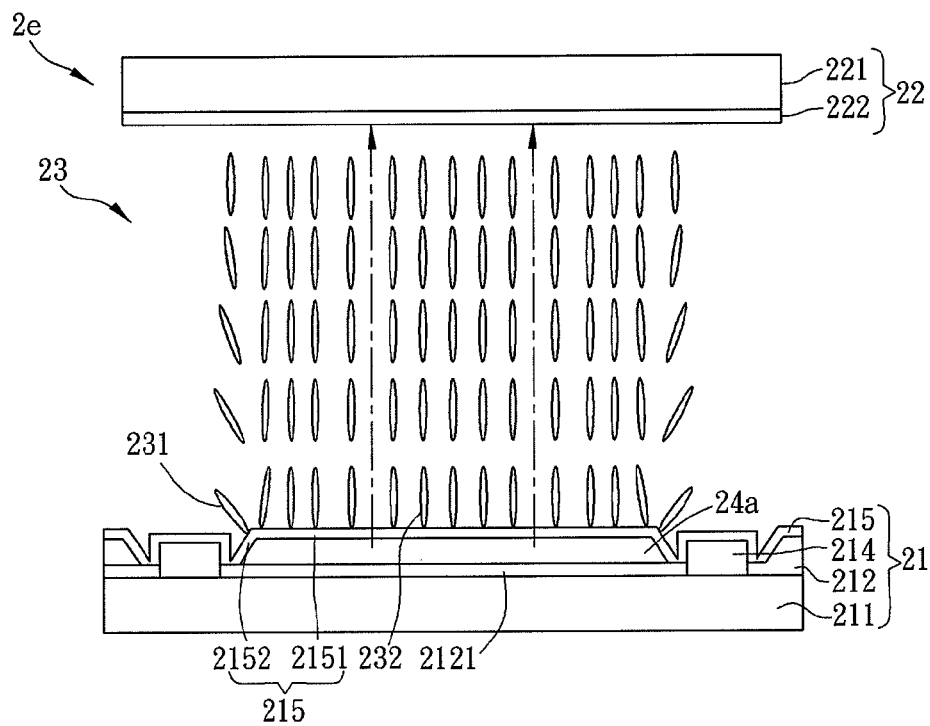

With reference to FIG. 15, the first orienting structure 24a is a concave object. The difference between FIG. 15 and FIG. 14A is that the first orienting structure 24a in FIG. 15 is formed by the notch on the edge of a flat layer, where the notch is between the flat layer and the conductor such as a row or column conductor.

The first alignment device 215 covers the notch on the edge of the flat layer, so that some liquid crystal molecules 231 in the liquid crystal layer 23 incline toward the outer part of the pixel unit 212 and some liquid crystal molecules 232 are aligned vertically.

In FIGS. 14A and 15, the alignment device 215 is disposed on the first orienting structure 24a, and a part 2151 of the alignment film 215 is parallel to the pixel electrode 2121 to force some liquid crystal molecules 232 to align roughly perpendicular to the first substrate 21, while another part 2152 thereof inclines with the pixel electrode 2121, which is affected by the first orienting structure 24a, to force some liquid crystal molecules 231 to incline on rather than being perpendicular to the first substrate 21. In other words, the first orienting structure 24a makes some liquid crystal molecules 231 in the liquid crystal layer 23 incline toward the external part of the pixel unit 212.

On the other hand, the first alignment device 215 may not fully cover the first orienting structure 24a, so that the concave part of the first orienting structure 24a is exposed. Some liquid crystal molecules 231 in the liquid crystal layer 23 incline with the affection of the concave part of the first orienting structure 24a, and some liquid crystal molecules 232 are aligned vertically.

Figure 16:
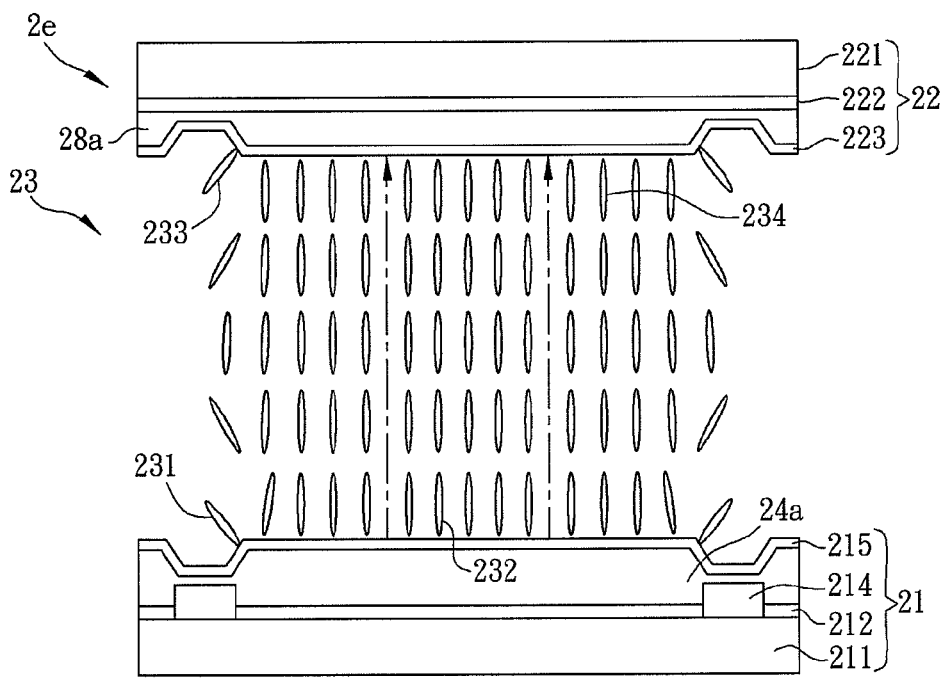

With reference to FIG. 16, the second substrate 22 further includes a second alignment device 223 and a second orienting structure 28. The second alignment device 223 is used to dispose the liquid crystal molecules along the normal line direction of the second alignment device 223, so that the liquid crystal molecules are roughly perpendicular to the surface of the second alignment device 223, and the second orienting structure 28 can force some liquid crystal molecules 223 in the liquid crystal layer 23 to incline toward the external part of the pixel unit 212.

In this case, the first orienting structure 24a and the second orienting structure 28a are both concave objects. The second orienting structure 28a may be formed by the same way as the first orienting structure 24a, for example, by using the concave part of a flat layer or the notch on the edge of a flat layer.

Figure 17:
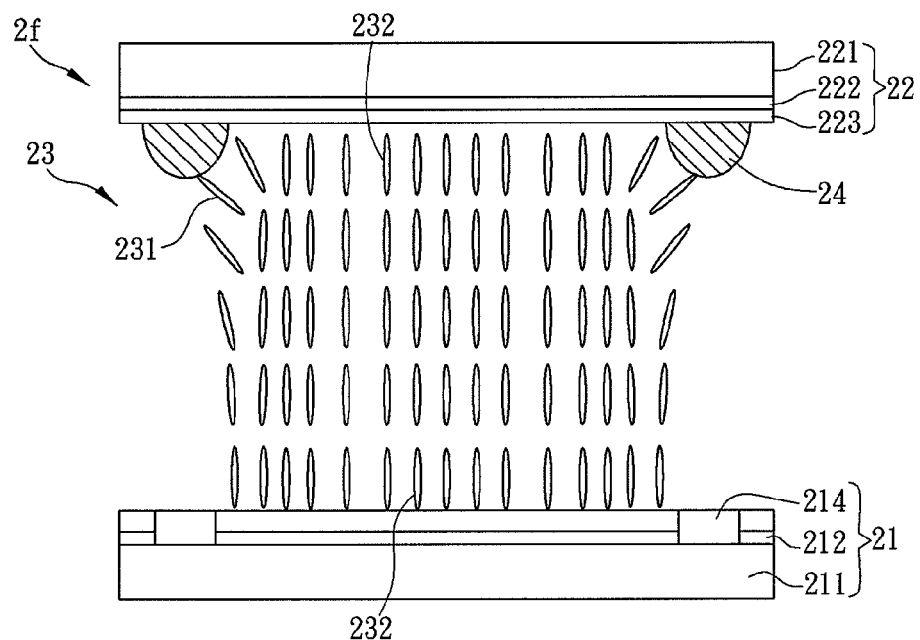
FIGS. 17 and 18 are schematic views of a LCD device according to another embodiment of the present invention.

In another embodiment as shown in FIG. 17, the first orienting structure 24 is disposed on the second substrate 22 rather than the first substrate 21 in the LCD device 2f, where the first substrate 21 does not contain an orienting structure.

The second substrate 22 includes the alignment device 223 and the first orienting structure 24 is a convex object. Although the alignment device 223 of this embodiment is disposed between the first orienting structure 24 and the counter electrode 222, the relation between the alignment device 223 and the first orienting structure 24 may have other variations as mentioned in the previous embodiments. For example, the alignment device 223 may cover the first orienting structure 24; alternatively, the alignment device 223 may be disposed on the counter electrode 222 while the first orienting structure 24 is exposed.

On the contrary, the first orienting structure 24 may be a concave object. The relation between the alignment device 223 and the first orienting structure 24 may have other variations as described in the previous embodiments. For example, the alignment device 223 may cover the first orienting structure 24; alternatively, the alignment device 223 may expose the concave part of the first orienting structure 24.

Figure 18:
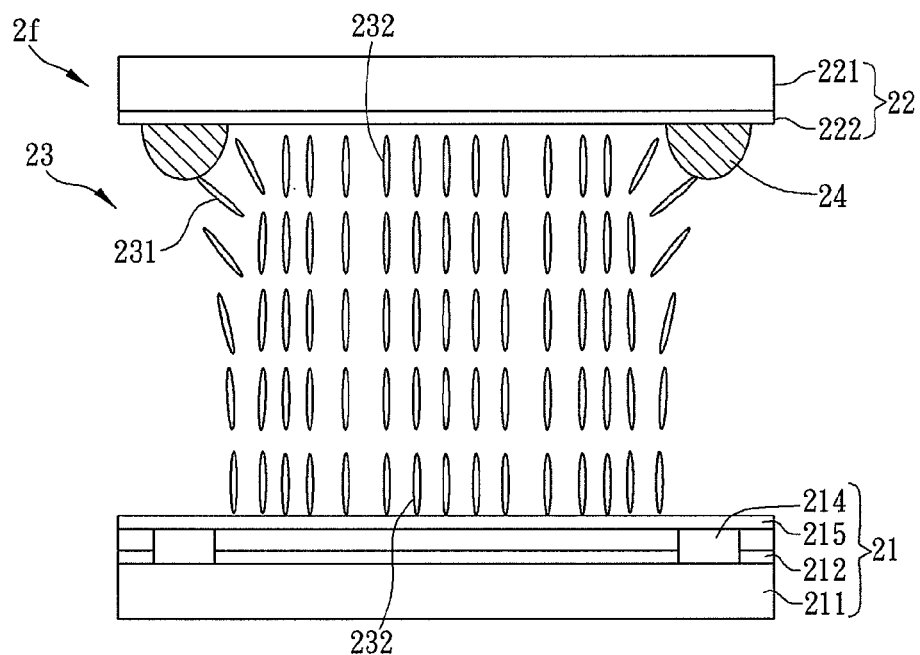

With reference to FIG. 18, the difference between FIG. 17 and FIG. 18 is in that the second substrate 22 of FIG. 18 does not have an alignment device and the first substrate 21 has one. On the other hand, an alignment device may also be disposed on the second substrate 22. The relative variation between the alignment device and the orienting structure are discussed in the previous embodiments, so a detailed description will be omitted herein.

As described in the previous embodiment, when the electric field is applied to the liquid crystal layers of the LCD devices in FIGS. 14A to 18, the shapes of the liquid crystal molecules in each of the liquid crystal sublayers may be those shown in FIGS. 6A to 6C. Since the related information is discussed in the previous embodiments, a detailed description will be omitted herein.

Moreover, the light leakage area of the pixel caused by the first orienting structure of the above-mentioned embodiments is smaller than that in the prior art, so that a black matrix is not required on the first substrate, which enlarges the effective display area of the LCD device and increases the aperture ratio.

The LCD device of the previous embodiment possessing such high display qualities as wide viewing angle, high contrast, and high aperture ratio has a simple structure and is compatible to the present manufacturing process of the LCD device, thereby facilitating the production thereof.

The first substrate disclosed in the above-mentioned embodiments includes a plurality of pixel units defined by the row conductors and the column conductors that are disposed alternately. Each pixel unit may correspond to one color and a certain amount of the pixel units may form a pixel, for example, these pixel units are three pixel units corresponding to colors red, green and blue, respectively. Moreover, a pixel unit may further include a plurality of sub-pixel areas.

In the liquid crystal layer disclosed in the previous embodiments, the area of a concentric circular pattern or a spiral pattern may be limited to a pixel unit, a pixel, a sub-pixel area of a pixel unit, a plurality of sub-pixel areas, or a plurality of pixels.

To sum up, a wide viewing angle LCD device having no singular point according to the present invention utilizes the optical rotation characteristics of the liquid crystal molecules for increasing the light transmission rate and the vertically-aligned liquid crystal molecules for increasing the contrast, so as to keep the advantages of the conventional TN LCD device and the MVA LCD device as well as prevent the light leakage problem of the TN LCD device.

To conclude, the LCD device of the present invention discloses that the first orienting structure is located on the outside of the display area and makes the liquid crystal molecules of the liquid crystal layer incline toward the internal part of the pixel electrode. Compared to the conventional MVA LCD device, the LCD device of the present invention not only overcomes the visual defect caused by the singular point but also achieve the wider viewing angle effect.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A liquid crystal display device having at least one display area, comprising:
    a first substrate having at least one pixel unit, wherein the pixel unit has a pixel electrode located in the display area;
    a second substrate disposed opposite to the first substrate;
    a liquid crystal layer disposed between the first substrate and the second substrate, wherein an optical rotation material is added to the liquid crystal layer; and
    at least one first orienting structure located outside the display area and making a part of liquid crystal molecules of the liquid crystal layer incline toward an internal part or an external part of the pixel unit.

2. The liquid crystal display device according to claim 1, wherein the first orienting structure is disposed on the first substrate or the second substrate.

3. The liquid crystal display device according to claim 1, wherein a predetermined inclined angle of the liquid crystal molecules made by the first orienting structure is between 5 and 80 degrees.

4. The liquid crystal display device according to claim 1, wherein when an electric field is applied to the liquid crystal layer, the liquid crystal molecules in a sublayer of the liquid crystal layer are aligned in a concentric circular pattern, a spiral pattern, or an annular pattern.

5. The liquid crystal display device according to claim 1, wherein when an electric field is applied to the liquid crystal layer, the liquid crystal molecules of the liquid crystal layer are gradually rotated from the first substrate to the second substrate.

6. The liquid crystal display device according to claim 1, wherein when an electric field is applied to the liquid crystal layer, the orientations of the liquid crystal molecules of the liquid crystal layer arranged from the first substrate to the second substrate are gradually from vertical to horizontal with rotation, then gradually rotating in horizontal, and then gradually from horizontal to vertical with rotation.

7. The liquid crystal display device according to claim 1, wherein the ratio of the thickness of the liquid crystal layer to a chiral pitch ranges from 0.16 to 0.42, and the liquid crystal molecules of the liquid crystal layer is a nematic liquid crystal material with negative dielectric anisotropy.

8. The liquid crystal display device according to claim 1, wherein the first orienting structure is a convex object or a concave object.

9. The liquid crystal display device according to claim 1, wherein the first substrate is a driving array substrate, and the first orienting structure is formed by a row conductor, a column conductor, or a gap of a pixel electrode of the driving array substrate.

10. The liquid crystal display device according to claim 1, wherein the first substrate further comprising:
    a first alignment device vertically aligning another part of the liquid crystal molecules.

11. The liquid crystal display device according to claim 10, wherein the first alignment device covers the first orienting structure and makes a part of the liquid crystal molecules incline toward the internal part of the pixel unit.

12. The liquid crystal display device according to claim 1, further comprising:
    a second orienting structure disposed on the first substrate or the second substrate different from the first orienting structure, and making a part of the liquid crystal molecules incline toward the internal part or the external part of the pixel unit.

13. The liquid crystal display device according to claim 12, wherein the second orienting structure is a convex object or a concave object.

14. The liquid crystal display device according to claim 12, wherein the second substrate is a counter substrate, and the second orienting structure is formed by a black matrix of the counter substrate or a gap of a counter electrode.

15. The liquid crystal display device according to claim 12, wherein the second orienting structure is located outside the display area.

16. The liquid crystal display device according to claim 12, wherein the second substrate further comprising:
    a second alignment device vertically aligning another part of the liquid crystal molecules.

17. The liquid crystal display device according to claim 16, wherein the second alignment device covers the second orienting structure and makes a part of the liquid crystal molecules incline toward the internal part of the pixel unit.

18. The liquid crystal display device according to claim 1, wherein the first orienting structures are disposed adjacent to the pixel electrode.

19. The liquid crystal display device according to claim 1, wherein the first orienting structures are disposed adjacent to at least two corners or at least two sides of the pixel electrode.

20. The liquid crystal display device according to claim 1, wherein the pixel unit comprises two sub-pixel areas, and the first orienting structures are disposed adjacent to at least two corners or at least two sides of the sub-pixel areas.

21. The liquid crystal display device according to claim 1, wherein the first orienting structure is in any shape.

* * * * *